United States Patent [19]
Meredith et al.

[11] 3,876,727
[45] *Apr. 8, 1975

[54] PLASTIC COMPOSITION AND METHOD OF PREPARING SAME

[76] Inventors: Curtis L. Meredith, 7940 Jefferson Hwy.; George A. Von Bodungen, 3836 Partridge Ln., both of Baton Rouge, La. 70809

[ * ] Notice: The portion of the term of this patent subsequent to June 20, 1889, has been disclaimed.

[22] Filed: June 16, 1972

[21] Appl. No.: 263,530

Related U.S. Application Data

[63] Continuation-in-part of Ser. No. 878,874, Nov. 21, 1969.

[52] U.S. Cl.............................. 260/878; 260/876 R
[51] Int. Cl......................... C08f 15/04; C08f 27/00
[58] Field of Search............ 260/80.78, 878 R, 33.6, 260/33.8

[56] References Cited
UNITED STATES PATENTS 3,538,191  11/1970  Meredith et al. ................... 260/878
3,538,192  11/1970  Bishop .............................. 260/878
3,671,608   6/1972  Meredith et al. ............... 260/878 R

*Primary Examiner*—John C. Bleutge
*Assistant Examiner*—A. L. Clingman

[57]  ABSTRACT

An improved plastic composition formed by the reaction of an alkenyl aromatic monomer, an acrylic monomer and an interpolymer of ethylene, at least one other straight chain alpha-monoolefin and a compound selected from the group consisting of aliphatic and cycloaliphatic polyene compounds in the presence of a free radical catalyst in an organic solvent, and in the presence of a seed mixture comprising a mixture of said monomers and said interpolymer which has been reacted to at least 5% conversion based on said monomers.

20 Claims, No Drawings

PLASTIC COMPOSITION AND METHOD OF PREPARING SAME

This is a continuation-in-part of copending application Ser. No. 848,874, filed Nov. 21, 1969.

This invention relates to the preparation of plastic compositions, and more particularly to EPDM rubber-modified plastic compositions having improved properties.

A variety of high-impact or gum plastics, which are generally referred to in the art as "rubber-modified plastics," and methods for their preparation have been proposed. However, many of the plastics prepared by the prior art processes have failed to achieve optimum properties in all respects including impact resistance, tensile strength and hardness.

Substantial improvements in preparing rubber-modified plastic have been made by a simple one-step process disclosed in U.S. Pat. No. 3,538,191 wherein description is made of a process for preparing rubber-modified styrene-acrylic grafted terpolymers by interpolymerizing a rubbery polymer, an alkenyl aromatic monomer, such as styrene, and an acrylic monomer in the presence of an organic solvent. Rubber-modified plastics prepared by this process have been found to possess a variety of improved physical properties, such as improved impact resistance, as compared to rubber-modified plastics heretofore known.

In our copending parent application referred to above, there is described an improved rubber-modified plastic and a process for its preparation in which an alkenyl aromatic monomer and an acrylic monomer are reacted with an elastomeric interpolymer in the presence of 15 to 75% by weight of a seed mixture a mixture of the above monomers and the interpolymer which has been reacted to a specified conversion based on the monomers. The process described in the foregoing copending application is preferably carried out as a batch process, although, as described therein, a continuous process is likewise contemplated.

In the practice of the process as described in our parent application, the process is carried out using a seed mixture which has been reacted to 15 to 75% conversion. It has now been found that in a continuous process, the seed mixture employed can be reacted to a conversion as low as 5% based upon the monomers.

It is accordingly an object of the present invention to produce and to provide a process for producing rubber-modified plastics in a continuous process in which the rubber modified plastic is produced in an economical manner and is characterized by improved physical properties, including improved impact resistance.

The concepts of the present invention reside in a copolymer resin of an alkenyl aromatic monomer and an acrylic monomer which is grafted to an EPDM terpolymer to form an EPDM rubber-modified plastic and a continuous method for its preparation, wherein the alkenyl aromatic monomer, the acrylic monomer and the EPDM terpolymer are continuously interpolymerized in an organic solvent in the presence of a free radical catalyst and in the presence of a partially reacted seed mixture comprising the alkenyl aromatic monomer, the acrylic monomer and the terpolymer which has been reacted to 5 to 30% conversion based on the monomers, and preferably to a conversion within the range of 5 to 14% based on the monomers.

It has been found in the practice of the invention that the use of a continuous process permits the use of a seed mixture which has been reacted to a conversion as low as 5% based on the monomers to produce an EPDM rubber-modified plastic having improved mechanical properties including improved impact resistance as compared to processes in which the interpolymerization is carried out without the presence of a seed mixture.

In accordance with one embodiment of the invention, the continuous process is carried out in a series of three or more separate reaction zones connected in series in which fresh, unreacted reaction mixture is continuously supplied to the first of the reaction zones, and the reaction mixtures of each of the first and intermediate reaction zones are continuously withdrawn therefrom and supplied to the subsequent reaction zone. The reaction mixture of the last reaction zone of the series is carried to final conversion.

Thus, the portion of the reaction mixture which is not withdrawn from the first reaction zone is reacted to an intermediate stage of conversion, within the range of 5 to 30% based on the monomers and preferably 5 to 14%, and thus serves as the seed for the fresh feed which is supplied to the first reaction zone.

In accordance with another embodiment of the invention, the reaction is carried out in a tubular reaction zone in which the walls of the reaction zone are heated to a temperature sufficient to initiate the reaction. The tubular reaction zone is provided along its length with appendages at the wall of the tubular zone which displaces the reaction mixture from the areas near the walls of the zone to the center of the zone. Thus, fresh reaction mixture is suppled to the tubular zone and advanced therethrough in substantially non-turbulent or laminar flow whereby the reaction mixture adjacent the walls of the tubular zone is reacted to an intermediate stage of conversion as described above while the reaction mixture near or at the center of the tubular zone is essentially unreacted.

After the reaction mixture near the walls of the tubular zone has reached the desired stage of conversion, the partially converted reaction mixture is then admixed with the substantially fresh feed near the center of the zone to serve as the seed for such fresh feed. As will be appreciated by those skilled in the art, the degree of conversion of the reaction mixture adjacent of the wall of the tubular zone can be varied by varying the linear distance between the inlet of the tubular zone and position of the appendages or baffles located downstream of the inlet of the zone. Such reactors of themselves are wellknown to those skilled in the art and are commercially available.

The amount of the seed mixture present in the reaction mixture is not critical. However, it is generally preferred that the seed mixture constitute between 15 and 75% by weight of the reaction mixture, and preferably between 20 and 60% by weight.

The initial composition of the mixture which is reacted to form the seed mixture, prior to reaction, is preferably substantially the same as the composition of the fresh feed with which the partially reacted seed mixture is admixed. It has been found that best results are obtained when the ratio by weight between the alkenyl aromatic monomer and the acrylic monomer is at least 0.2–5 to 1, and is preferably in the range of 1–4 to 1. In the preferred embodiment where the alkenyl aromatic monomer and the acrylic monomer are styrene and acrylonitrile, respectively, the rubber-modified plastics of the invention achieve optimum properties when the weight ratio between styrene and acrylonitrile is within the range of 72:28 to 78:22, or about 3.1.

The reaction mixture to be polymerized should contain about 1–50 parts by weight, and preferably 4–25 parts by weight, of the rubbery polymer for each 99–50 parts by weight, and preferably 96–75 parts by weight, of the alkenyl aromatic monomer and the acrylic monomer. It will be appreciated that the alkenyl aromatic monomer and the acrylic monomer may be one or a mixture of more than one alkenyl aromatic monomer and/or acrylic monomer respectively. The reaction mixture also contains the free radical catalyst, preferably in an amount in the range of 0.25 to 2.5 parts by weight, and more preferably 0.5 to 1.3 parts by weight of the free radical catalyst or initiator for each 100 parts by weight of alkenyl aromatic monomers and acrylic monomers. Additionally, better results are frequently attained when the organic solvent content of the reaction mixture is varied between 50% by weight of the total weight of the reaction mixture at the lower limit of the EPDM terpolymer content mentioned above and 90% by weight thereof when the upper EPDM terpolymer range mentioned above is used. When the preferred range of the rubbery polymer is used, i.e., 4–25% by weight, then the solvent should be present in an amount constituting 85–60% by weight of the total reaction mixture.

The alkenyl aromatic monomers which may be used in the preparation of improved rubber-modified plastics according to the present invention includes alkenyl aromatic hydrocarbons containing 8-20 carbon atoms, and their halogenated derivatives. Specific examples of such monomers include styrene, chlorostyrene, alpha-alkyl styrene wherein the alkyl group contains 1-8 carbon atoms, such as alpha-methylstyrene, alphachlorostyrene, vinyl naphthalene, alkyl-substituted vinyl naphthalene wherein the alkyl group or groups contain 1-8 carbon atoms, and halogen-substituted vinyl naphthalene. Styrene is generally the preferred alkenyl aromatic monomer.

The acrylic monomer which may be used in the present invention are those monomers having a general formula:

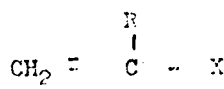

wherein R is selected from a group consisting of hydrogen and alkyl having 1-5 carbon atoms, and X is selected from a group consisting of:

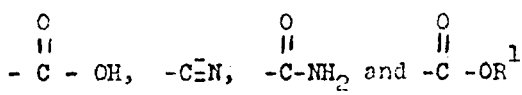

wherein $R^1$ is alkyl having 1-9 carbon atoms. Examples of such monomers which have been found to be of particular use include acrylonitrile, acrylamide, methylene or ethylene acryonitrile, acrylic, methacrylic, and ethyl-acrylic acid and the methyl, ethyl, propyl and isopropyl esters thereof. Acrylonitrile is generally the preferred acrylic monomer.

The EPDM terpolymers useful in the present invention are generally those elastomers prepared by the reaction of ethylene, at least one other straight chain alpha-monoolefin having 3–16 carbon atoms, such as propylene, isobutylene, etc., and an aliphatic or cycloaliphatic polyene monomer having 4 to 20 carbon atoms.

The polyene monomers can be conjugated dienes such as 1,3-butadiene, isoprene, chloroprene, 1,4-hexadiene, as well as a variety of other conjugated polyenes, but are preferably non-conjugated aliphatic and cycloaliphatic dienes, such as non-conjugated hexadiene, octadiene, etc. Terpolymers prepared from the foregoing generally have relatively low unsaturation and their preparation is known to those skilled in the art.

The preferred EPDM elastomers having relatively low unsaturation are those prepared by the interpolymerization of a monomeric mixture containing 10–90 mole percent ethylene and 10–90 mole percent of at least one other straight chain alphamonoolefin containing 3–16 carbon atoms and preferably propylene, and from 0.1 to 10 mole percent of an unsaturated bridged-ring hydrocarbon having at least one carbon-to-carbon double bond in a bridged ring in a solution of hexane or other organic solvent, and in the presence of a catalyst prepared from vanadium oxytrichloride and methyl or ethyl aluminum sesquichloride or other suitable Ziegler catalyst. The preparation of such EPDM terpolymers is disclosed in U.S. Pat. Nos. 2,933,480, 3,093,620, 3,093,621, 3,211,709, 3,113,115 and 3,300,450, the teachings of which are incorporated herein by reference.

It is preferred that the elastomers having low unsaturation be prepared from a monomeric mixture containing ethylene, propylene and the polyunsaturated bridged-ring hydrocarbon, in proportions to produce a polymer having good elastomeric properties and an unsaturation level of at least 2 carbon-to-carbon double bonds per thousand carbon atoms in the polymer. For example, the elastomer may contain chemically bound therein molar ratios of ethylene to propylene varying between 80:20 and 20:80, and between 70:30 and 55:45 for better results. The bridged-ring hydrocarbon may be chemically bound therein in an amount to provide an unsaturation level of 2–25, and preferably about 3–16 carbon-to-carbon double bonds per thousand carbon atoms in the polymer.

Examples of the bridged-ring hydrocarbons include the polyunsaturated derivatives of bicyclo-(2,2,1)-heptane wherein at least one double bond is present in one of the bridged rings, such as dicyclopentadiene, bicyclo(2,2,1) hepta-2,5-diene, the alkylidene norbornenes, and especially the 5-alkylidene-2-norbornenes wherein the alkylidene group contains 1-20 carbon atoms and preferably 1-8 carbon atoms, the alkenyl norbornenes, and especially the 5-alkenyl-2-norbornenes wherein the alkenyl group contains about 3-20 carbon atoms and preferably 3-10 carbon atoms. Other bridged-ring hydrocarbons include polyunsaturated derivatives of bicyclo-(2,2,2)-octane as represented by bicyclo (2,2,2) octa-2,5-diene, polyunsaturated derivatives of bicyclo (3,2,1)-octane, polyunsaturated derivatives of bicyclo(3,3,1)-nonane, and polyunsaturated derivatives of bicyclo-(3,2,2)-nonane. At least one double bond is present in a bridged ring of the above compounds, and at least one other double bond is present in a bridged ring or in a side chain. Specific examples of bridged-ring compounds include 5-methylene-2-norbornene, 5-ethylidene-2-norbornene, 5-isopropylidene-2-norbornene, dicyclopentadiene, the methyl butenyl norbornenes such as 5-(2-methyl-2-butenyl)-2-norbornene, or 5-(3-methyl-2-butenyl)-2-norbornene and 5-(3,5-dimethyl-4-hexenyl)-2-norbornene. The elastomers prepared from ethylene, at least one monoolefin containing 3-16 carbon atoms, and the 5-alkylidene-2-norbornenes, wherein the alkylidene group contains 1-20 and preferably 1-8 carbon atoms, produce novel rubber-modified plastics which have exceptional properties. The elastomer prepared from 5-ethylidene-2-norbornene is much preferred as it has outstanding properties and produces many unusual and unexpected results when used as the elastomer in the plastic compositions of the invention. As a result, this elastomer is in a class by itself.

In instances where an elastomer is employed which has no unsaturation or very little unsaturation, then it is often desirable to prepare a hydroperoxide thereof by oxidation prior to the polymerization step of the present invention. The oxidation may be in accordance with prior art practice, such as by heating a solution of the elastomer in the presence of molecular oxygen and an organic peroxide or hydroperoxide as a catalyst. In one suitable method, the elastomer is dissolved in a mixture of benzene and hexane, and benzoyl peroxide is added as a catalyst for the oxidation. The reaction vessel is pressurized to 50 psi with oxygen and maintained at 70° C. for 0.5 to 8 hours. Oxidation can also be effected without a free radical catalyst by reacting for 2 to 20 hours. The resin monomers are added to the solution of the oxidized rubber, with or without adding an additional free radical catalyst, and polymerized to form a rubber-modified plastic according to the present invention. The hydroperoxide groups may alone act as the free radical catalyst for the monomer polymerization. It is understood that the elastomer may be oxidized to form hydroperoxide groups thereon whenever there is difficulty in reacting the elastomer substrate with the graft monomers in the desired amounts to thereby achieve greater ease of grafting.

A wide variety of free radical polymerization catalysts may be employed, including those used in the prior art processes for preparing high impact polystyrene and styrene-acrylonitrile plastics. In some instances, the hydroperoxide groups that are formed by oxidation of the rubbery component may act as the free radical catalyst. Examples of free radical polymerization catalysts include the organic peroxides such as benzoyl peroxide, lauroyl peroxide, propionyl peroxide, 2,4-dichlorobenzoyl peroxide, acetyl peroxide, tertiary butyl hydroperoxide, tertiary butyl perbenzoate, tertiary butyl peroxyisobutyrate, and dicumylperoxide. Mixtures of one or more peroxides may be employed. Additionally, mixtures of one or more peroxides with azo-bisdiisobutyronitrile give better results in some instances, and especially where a less active catalyst is effective. For example, when using the highly unsaturated diene rubbers, or rubbers of low or high unsaturation that have been subjected to an oxidation step to form hydroperoxide groups thereon, then a less active free radical catalyst should be used for optimum results. The catalyst mixture may contain 25-75% and preferably about 50% by weight of the azo-bisdiisobutyronitrile, and 75-25%, and preferably about 50% by weight, of one or more of the above organic peroxides. In instances where an unoxidized elastomer is used having a low degree of unsaturation, then it is desirable to employ a highly active free radical initiator, e.g., a prior art initiator which is known to abstract hydrogen from the elastomer and rapidly catalyze the graft reaction. Many examples of such highly active free radical initiators are known, such as benzoyl peroxide.

The organic solvent that is selected must be a solvent for the rubbery polymer. Examples of suitable solvents include aromatic hydrocarbons such as benzene, benzene substituted with one or more alkyl groups containing 2-4 carbon atoms such as toluene, dimethylbenzene, xylene and their higher homologs, naphthalene, naphthalene substituted with one or more alkyl groups containing 1-4 carbon atoms such as alpha-methyl or beta-methyl naphthalene and their higher homologs, paraffin and cycloparaffin hydrocarbons containing 5-15 carbon atoms, and preferably 6-10 carbon atoms, such as pentane, n-hexane, 3-methylpentane, 2-methylpentane, 2,2- and 2,4-dimethylpentane, heptane, cyclopentane, cyclohexane, and alkyl substituted cyclopentanes and cyclohexanes wherein the alkyl group or groups contain 1-4 carbon atoms, including methyl cyclopentane, methyl cyclohexane and their homologs. The halogenated derivatives of the above solvents may be employed, and especially the chlorene and bromine derivatives. Chlorobenzene is very useful as a solvent.

Mixtures containing two or more of the foregoing solvents may be used, and are preferred in many instances. Examples of solvent mixtures which give unusually good results include an aromatic component such as benzene and/or toluene, and a paraffin or cycloparaffin hydrocarbon component containing six through 8 carbon atoms such as n-hexane, 3-methylpentane, 2-methylpentane, n-heptane, methyl hexanes, n-octane, methyl octanes methylcyclopentane, and/or cyclohexane.

Usually better results are obtained when the above solvent mixtures contain about 40-60% by weight of the aromatic solvent component, and about 60-40% by weight of the paraffin or cycloparaffin hydrocarbon component. Best results are usually obtained when about 50% by weight of each component is present.

It will be understood by those skilled in the art that in the practice of the present invention there is a tendency for the final conversion to be somewhat lower than that of a batch process because of the dilution of the partially reacted seed mixture with fresh unreacted feed, particularly in those instances where the seed mixture constitutes a larger portion of the reaction mixture. This reduction in conversion can be advantageously compensated for by the incremental addition of a non-aromatic or aliphatic solvent to the reaction mixture after the reaction is commenced. The non-aromatic solvents found most suitable for this purpose are the paraffin and cycloparaffin solvents disclosed above, with the most preferred solvent being hexane.

Without limiting the invention as to theory, it is believed that non-aromatic solvents, such as hexane, are poorer solvents for the graft terpolymer product formed by the process of the invention, and thus there is a tendency for the product to precipitate out of the reaction mixture as it is formed, thereby driving the reaction further toward 100% conversion. The use of this technique in the process of the invention has further advantages in that there are less of the unreacted monomers to be separated from the final product, and the coagulation proceeds more smoothly to provide a product in the form of a fine powder.

The amount of the solvent added to the reaction mixture is not critical, and is preferably an amount up to 50% by weight of the total amount of solvent present in the reaction mixture prior to the addition of the non-aromatic solvent. When a non-aromatic solvent is added incrementally to the reaction mixture in accordance with this concept, the total amount of the solvent and the relative proportions of the aromatic and non-aromatic solvents, when a mixture of such solvents is used, initially present in the reaction mixture prior to the addition of the non-aromatic solvent remain essentially unchanged from the amounts disclosed above. It will be appreciated that the aliphatic solvent may be added in one or more increments.

The time of making the addition or additions depends primarily upon the reaction temperature, and generally falls between 1/7 and 6/7 of the total reaction time required to achieve at least 90% conversion. At higher reaction temperatures, it is generally desirable that the addition be made later during the course of reaction, and multiple additions are often preferred at such temperatures, including as many as 5 incremental additions during the course of the reaction.

The temperature of the polymerization reaction may vary over wide ranges. For example, reaction temperatures within the range of about 40°–150° C., and preferably within the range of about 60°–85° C. are generally satisfactory. It has been found that lower temperatures within these ranges generally result in rubber-modified plastics having increased impact resistance, whereas higher temperatures within the disclosed ranges generally result in a product having increased melt flow properties. In order to achieve optimum impact and melt flow properties in the product, it is particularly preferred to operate within the narrow range of 70°–80° C. In general, use is made of a reaction temperature such that the free radical initiator should have a half life of 4–15 hours. The reaction is continued for a sufficient period of time to insure the desired percent conversion of the monomers present in the reaction mixture. The reaction time will vary somewhat with the specific catalyst, solvent system, rubbery polymer, monomers and reaction temperature which are employed. However, reaction temperatures within the range of 4–24 hours are generally satisfactory. In any event, the reaction is preferably continued until at least 60% by weight of the monomeric material present in the reaction mixture has been converted to polymer, and preferably until a conversion within the range of 90–95% by weight is reached.

The reaction mixture also may contain a cross-linking agent, i.e., a compound containing at least two reactive sites such as two or more ethylenic double bonds. Examples of cross-linking agents are divinylbenzene, divinyl ether of diethylene glycol, triallylcyanurate, and 1,3-butylene-dimethacrylate. The cross-linking agent may be added in an amount of, for example, 0.005–1.0 parts by weight, and preferably about 0.01 to 0.5 parts by weight, per 100 parts by weight of the monomeric material to be polymerized. Still other types of cross-linking agents may be employed as it is only necessary that it have two or more reactive sites under the conditions of the polymerization.

The reaction mixture may be agitated during the polymerization but vigorous agitation is not necessary. As the polymerization proceeds, the resinous copolymer that is formed generally precipitates in a finely dispersed form and remains suspended in the reaction mixture. The EPDM terpolymer generally remains dissolved in the solution after it has been grafted with the resin-forming monomers. Thus, the polymerization reaction simultaneously produces a resinous copolymer of the alkenyl aromatic and acrylic monomers and the EPDM terpolymers grafted with the resin-forming alkenyl aromatic and acrylic monomers. As a result, at the end of the polymerization the reaction mixture contains all the components which are needed for a high impact plastic composition, and it is only necessary to recover the products of the polymerization therefrom.

The plastic composition may be recovered from the reaction mixture by coagulation with a lower alcohol such as methyl, ethyl or isopropyl alcohol, or by flashing off the solvent. When the product is recovered by flashing the solvent, preferably the reaction mixture is passed into a vessel containing boiling water. Steam is supplied to the vessel and the solvent evaporates and is removed overhead as a vapor, together with any free monomer content. The plastic product is recovered as a solid in particulate form, and it may be dewatered, washed in water to remove water-soluble impurities, and air dried or, preferably dried at an elevated temperature, such as at a temperature within the range of 50°–150° C. until the water content is removed. Fluidized bed drying at 50°–150° C. also may be used in most instances with good results. The dried plastic composition may be pelletized or formed into other desirable shapes suitable for marketing.

Prior art antioxidants, processing aids, and other compounding ingredients and aids may be added at any convenient point in the process. Inasmuch as these ingredients are soluble or dispersible in the organic solvent, they may be added to the polymerization mixture prior to recovery of the product. Examples of suitable antioxidants include phosphited polyalkyl polyphenols and tri(mixed mononyl-dinonyl) phenyl phosphite. Examples of processing aids are mineral oils and the salts and esters of higher fatty acids. When desired, coloring agents may be added to produce colored resins. The coloring pigments of the prior art are suitable for this purpose.

The high impact plastic compositions prepared by the process of the present invention have superior physical properties, and particularly superior impact resistance, as compared to similar products prepared from EPDM terpolymers which have not been, prior to polymerization, oil-extended. Additionally, by using the preferred EPDM terpolymers having low unsaturation, particularly the terpolymers of ethylene, propylene and 5-alkylidene-2-norbornene, even better physical properties may be obtained. The novel plastic composition of the present invention comprises (A) a resinous copolymer of an alkenyl aromatic monomer and an acrylic monomer and (B) a graft interpolymer of (1) an elastomeric interpolymer of ethylene, at least one other alpha-monoolefin and an aliphatic or cycloaliphatic polyene, (2) an alkenyl aromatic monomer and (3) an acrylic monomer.

As indicated, the preferred polyenes are the 5-alkylidene-2-norborenes, wherein the alkylidene group contains 1-8 carbon atoms, with the preferred species being 5-ethylidene-2-norbornene.

Having described the basic concepts of the invention, reference is now made to the following examples, which are provided by way of illustration but not of limitation, of the practice of the invention.

EXAMPLE 1

This example illustrates a continuous process in which there is employed three reactors in series, each of which is equipped with a stirrer.

The terpolymer used in this example is an interpolymer of ethylene, propylene and 5-ethylidene-2-norbornene, which contains about equal weights of ethylene and propylene and sufficient 5-ethylidene-2-norbornene to provide an unsaturation level of 8.7 carbon-to-carbon double bonds per 1,000 carbon atoms and which has a Mooney value of 66 (ML-4).

A reaction mixture is prepared from the above terpolymer, styrene and acrylonitrile having the following composition:

|  | Parts by Weight |
| --- | --- |
| Benzene solvent | 700 |
| Hexane solvent | 700 |
| Styrene | 450 |
| Acrylonitrile | 150 |
| EPDM | 82 |
| Benzoyl peroxide | 6 |

The above reaction mixture is continuously fed to the reaction system, and the flow rates are adjusted such that the conversion of the reaction mixture in the first reactor is 8% based on the monomers. The fresh feed constitutes about 50% by weight of the mixture therein. Reactors 1 and 3 are maintained at 74°C while reactor 2 is at 70°C.

The reaction mixture in reactor 3 is allowed to reach final conversion, with the total reaction time being 9 hours. The Izod impact of the resulting EPDM rubber modified plastic is 4.2 ft.-lb./inch-notch.

EXAMPLE 2

This example illustrates the use of a seed mixture with a higher conversion.

Using the apparatus, reaction mixture formulation and procedure described in Example 1, the reaction mixture is continuously fed to the reaction system, and the flow rates are adjusted such that the conversion in the first reactor is 20% based on the monomers.

The reaction is continued for 9 hours, and final conversion is achieved in the third reactor. The product has an Izod impact of 4.2 ft.-lb./inch-notch.

EXAMPLE 3

The procedure described in Example 1 is repeated except that the reaction mixture has the following composition:

|  | Parts by Weight |
| --- | --- |
| Benzene | 780 |
| Hexane | 780 |
| EPDM terpolymer of Example 1 | 108 |
| Alpha-methylstyrene | 634 |
| Acrylic acid | 168 |
| Benzoyl peroxide | 7 |

Conversion of the seed in the first reactor is 10% based on the monomers, and final conversion is achieved in 10 hours.

EXAMPLE 4

The terpolymer used in this example is a terpolymer of about equal weights of ethylene and propylene and sufficient 1,4-hexadiene to provide a rubber terpolymer containing 3 carbon-to-carbon double bonds per 1000 carbon atoms.

The terpolymer is formulated into the following reaction mixture:

|  | Parts by Weight |
| --- | --- |
| Toluene | 700 |
| Hexane | 700 |
| EPDM terpolymer | 105 |
| Styrene | 450 |
| Acrylonitrile | 150 |
| Benzoyl peroxide | 6 |

The reaction mixture is supplied to the reactor system described in Example 2. Conversion in the first reactor is 12% based on the monomers.

Comparable results are obtained.

EXAMPLE 5

This example illustrates the use of a tubular reactor in the practice of this invention.

The reaction mixture of Example 1 is continuously supplied to a tubular reactor having baffles positioned annularly about the interior wall of the reactor downstream of the inlet to the reactor. The baffles are positioned in invert the reaction mixture whereby the portion of the reaction mixture flowing through the tube adjacent to the walls is admixed with the portion of the reaction mixture flowing through the tube adjacent the center of the reaction.

The walls of the reactor are maintained at a temperature of about 77°C., and the reaction mixture is passed through the reactor in substantially laminar flow. The baffles are positioned from the inlet of the reactor at a distance sufficient to permit the portion of the reaction mixture adjacent the wall to reach a conversion of 9% based on the monomers. Through temperature measurements over the cross section of the tubular reactor and samples withdrawn over the cross section of the reactor with an adjustable Pitot tube, it is determined that the reaction mixture which has been advanced to 9% conversion constitutes about 41% of the total reaction mixture at the point of conversion of the reaction mixture.

The reaction mixture is allowed to reach final conversion in about 8 hours. The rubber modified plastic product is found to have improved impact strength.

EXAMPLE 6

Using the procedure described in Example 5, the reaction mixture of Example 4 is reacted in the tubular reactor of Example 5. The baffles are adjusted so that the portion of the reaction mixture adjacent the wall of the tube, which is maintained at 80° C., is reacted to 12% conversion at the point where the reaction mixture is inverted.

Final conversion is achieved in 8 hours, and comparable results are achieved.

It will be understood that various changes and modifications can be made in the details of formulation, procedure and use without departing from the spirit of the invention, especially as defined in the following claims.

We claim:

1. In a continuous process for preparing improved plastic compositions wherein 99 to 50 parts by weight of an alkenyl aromatic monomer and an acrylic monomer having the formula $$CH_2 = C - X$$
$$\phantom{CH_2 = }\vert$$
$$\phantom{CH_2 = }R$$

wherein R is selected from the group consisting of hydrogen and $C_1$ to $C_5$ alkyl and X is selected from the group consisting of:

$$-\overset{O}{\underset{\|}{C}} - OH, \quad -C\equiv N, \quad -\overset{O}{\underset{\|}{C}}-NH_2 \quad \text{and} \quad -\overset{O}{\underset{\|}{C}}-OR'$$

wherein R' is $C_1$ to $C_9$ alkyl in which the weight ratio between the alkenyl aromatic monomer and the acrylic monomer is within the range of 0.2 to 5, and 1 to 50 parts by weight of an elastomeric interpolymer of ethylene, at least one straight chain alpha-monoolefin containing 3 to 16 carbon atoms and a compound selected from the group consisting of aliphatic and cycloaliphatic polyenes are reacted in an inert organic solvent in the presence of a free radical catalyst, the improvement comprising continuously reacting a reaction mixture of said monomers and said interpolymer in the presence of 15 to 75% by weight of a seed mixture comprising a mixture of said monomers and said interpolymer which has been reacted to 5 to 30% conversion based on said monomers.

2. A process as defined in claim 1 wherein said seed mixture has been reacted to a conversion within the range of 5 to 14% based upon said monomers.

3. A process as defined in claim 1 wherein said seed mixture constitutes from 20-60% by weight of the reaction mixture.

4. A process as defined in claim 1 wherein said alpha-monoolefin is propylene.

5. A process as defined in claim 1 wherein said polyene compound is a polyunsaturated bridged-ring compound having at least one carbon-to-carbon in a bridged ring.

6. A process as defined in claim 1 wherein said polyene compound is a polyunsaturated derivative of a compound selected from the group consisting of bicyclo-(2,2,1)-heptane, bicyclo-(2,2,2)-octane, bicyclo-(3,2,1)-octane, bicyclo-(3,3,1)-nonane and bicyclo-(3,2,2)-nonane.

7. A process as defined in claim 1 wherein said polyene compound is 5-alkylidene-2-norbornene.

8. A process as defined in claim 1 wherein said terpolymer is a terpolymer of ethylene, propylene, and 5-ethylidene-2-norbornene.

9. A process as defined in claim 1 wherein said alkenyl aromatic monomer is styrene and said acrylic monomer is acrylonitrile.

10. A process as defined in claim 1 wherein the weight ratio between the alkenyl aromatic monomer and acrylic monomer is 1-4 to 1.

11. A process as defined in claim 1 wherein the reaction mixture contains 4-25 parts by weight of said terpolymer for each 96-75 parts by weight akenyl aromatic monomer and said acrylic monomer.

12. A process as defined in claim 1 wherein said organic solvent is selected from a group consisting of aromatic hydrocarbon and the alkyl- and halogen-substituted derivatives, aliphatic hydrocarbons and their halogenated derivatives and mixtures thereof.

13. A process as defined in claim 1 wherein said solvent is a mixture of aromatic and aliphatic solvent.

14. A process as defined in claim 1 wherein the reaction is carried out at a temperature within the range of 40°-150° C.

15. A process as defined in claim 1 wherein an aliphatic solvent is added to the reaction mixture in at least one increment during the reaction.

16. A process as defiined in claim 15 wherein said increment is added at a time falling within 1/7 and 6/7 of the total reaction time required to achieve at least 90% conversion based on said monomers.

17. A process as defined in claim 1 wherein the reaction is carried out at a temperature within the range of 70°-80° C.

18. A process as defined in claim 1 wherein the reaction mixture is continuously supplied to at least three reaction zones in series whereby the reaction mixture in the first reaction zone is converted to a conversion within the range of 5 to 30% and serves as the feed for the reaction mixture continuously supplied.

19. A process as defined in claim 1 wherein the reaction is carried out in a tubular reaction zone heated along its wall containing baffles downstream from the inlet of the tubular zone, and the reaction mixture is advanced through the tubular zone in substantially non-turbulent flow whereby the reaction mixture near the wall of the tubular zone is reacted to a conversion within the range of 5 to 30% based on the monomers and the reaction mixture near the center of the tubular zone remains substantially unreacted, and the reaction mixture near the wall of the tubular zone is blended with the reaction mixture near the center of the tubular zone as seed for the reaction on contact with the baffles.

20. A process as defined in claim 19 wherein the reaction mixture near the wall of the tubular zone is reacted to a conversion of 5 to 14% based on the monomers.

* * * * *